(12) United States Patent
Krishnaswamy et al.

(10) Patent No.: US 7,966,089 B1
(45) Date of Patent: Jun. 21, 2011

(54) METHOD AND APPARATUS FOR AUTOMATED FAB CONTROL

(75) Inventors: Chandra Shekar Krishnaswamy, Austin, TX (US); Michael Alan Retersdorf, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 435 days.

(21) Appl. No.: 11/174,876

(22) Filed: Jul. 5, 2005

(51) Int. Cl.
*G06F 19/00* (2011.01)
(52) U.S. Cl. .................. 700/101; 700/116; 700/121
(58) Field of Classification Search .............. 700/100, 700/101, 121, 114, 115, 116; 705/7–9
See application file for complete search history.

(56) References Cited

U.S. PATENT DOCUMENTS

| | | | | |
|---|---|---|---|---|
| 5,282,139 A | * | 1/1994 | Kobayashi | 700/101 |
| 5,402,350 A | * | 3/1995 | Kline | 700/101 |
| 5,980,183 A | * | 11/1999 | Fosnight | 414/222.01 |
| 6,243,612 B1 | * | 6/2001 | Rippenhagen et al. | 700/100 |
| 6,411,859 B1 | * | 6/2002 | Conboy et al. | 700/101 |
| 6,594,598 B1 | * | 7/2003 | Ishizuka et al. | 700/109 |
| 6,865,433 B1 | * | 3/2005 | Burda | 700/101 |
| 2003/0158618 A1 | * | 8/2003 | Browning | 700/99 |
| 2004/0084520 A1 | * | 5/2004 | Muehl et al. | 235/376 |
| 2006/0213988 A1 | * | 9/2006 | Wang | 235/385 |
| 2006/0246381 A1 | * | 11/2006 | Guruz et al. | 430/323 |

* cited by examiner

*Primary Examiner* — Albert Decady
*Assistant Examiner* — Steven R Garland
(74) *Attorney, Agent, or Firm* — Williams, Morgan & Amerson, P.C.

(57) ABSTRACT

A method, apparatus, and a system for prioritizing processing of a workpiece is provided. At least one workpiece is processed. A tag associated with the workpiece is provided. The tag includes process priority data for determining an order relating to processing the workpiece.

20 Claims, 8 Drawing Sheets

| | PRODUCT A | PRODUCT B |
|---|---|---|
| Yield | Low Yield | High Yield |
| Price | High Selling Price | Low Selling Price |
| Cycle Time | Low Cycle Time | High Cycle Time |
| Volume of Wafers | Low Volume | High Volume |
| Risk | High Risk Factor | Low Risk Factor |
| Other Business Factors | Captures New Markets | Expands Existing Markets |
| ... | ... | ... |
| | Currency/Value = X | Currency/Value = Y |

FIGURE 8

METHOD AND APPARATUS FOR AUTOMATED FAB CONTROL

BACKGROUND OF THE INVENTION

1. Field of the Invention

This invention relates generally to semiconductor manufacturing, and, more particularly, to a method and apparatus for performing automated control of a fab using an external parameter and an internal parameter.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a specific manufacturing process.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

Turning now to FIG. 2, a flowchart depiction of a prior art process flow is illustrated. Before processing the semiconductor wafers 105, a determination is generally made as to the type of product that is to be manufactured (block 210). This leads to a step for determining the process control parameters for processing a lot of semiconductor wafers 105. Often, an operator programs various control parameters for controlling processing of semiconductor wafers 105. These control parameters may be based upon several factors. Based upon the types of product to be manufactured, the manufacturing system directs various factory components (e.g., processing tools) to process the semiconductor wafers 105 according to a pre-determined scheduling process (block 220).

Generally, the scheduling is determined based upon various factors, such as the demand for a particular product to be manufactured, conditions relating to various processing tools in the factory/fab, availability of particular processing tools in the fab, process control requirements, etc. Substantially all of the scheduling for routing particular semiconductor wafers 105 throughout various components of a fab are generally predetermined. Based upon the scheduling process, the manufacturing system processes the semiconductor wafers 105 in sequence of arrival on the factory floor (block 230). As various lots of semiconductor wafers 105 are transported to the factory floor, they are routed throughout the fab floor and are processed according to predetermined scheduling. Some modifications to the routing of the semiconductor wafers 105 may be performed based upon feedback data received during processing of the wafers (block 240). For example, using process feedback data, a problem with a particular tool may be detected and a determination may be made to stop processing and/or reroute some portions of the lot of semiconductor wafers 105.

One of the problems associated with the current methodology includes the fact that the state-of-the-art processing methods are generally designed to optimize the maximum number of semiconductor wafers 105 that could be processed by a process stream. Quite often, external factors (e.g., business factors that are not directly associated with controlling the processing operations in the fab) are used to determine process parameters in a predetermined fashion. Therefore, various changes that may occur within various components of the fab, or changes relating to external factors, may not be efficiently analyzed in order to affect changes in the processing operations. In other words, changes in the factory components or external factors may not be dealt with efficiently due to the predetermined process scheduling that is generally used to control process operations. Generally, the various lots of semiconductor wafers 105 arriving at a particular factory floor are not differentiated and are given uniform process priority (e.g., a simple first-come first-served basis). In the state-of-the-art, the process priority is generally predetermined prior to the lots being sent to the factory/fab floor. This may result in inefficiencies in reacting to changes in marketing trends, other external factors, and/or internal changes within a factory/fab.

The present invention is directed to overcoming, or at least reducing, the effects of one or more of the problems set forth above.

SUMMARY OF THE INVENTION

In one aspect of the present invention, a method is provided for prioritizing processing of a workpiece. At least one workpiece is processed. A tag associated with the workpiece is provided. The tag includes process priority data for determining an order relating to processing the workpiece.

In another aspect of the present invention, a method is provided for prioritizing processing of a workpiece. At least one workpiece is received. The workpiece includes an associated value. The value includes process priority data for determining an order relating to processing the workpiece. The workpiece is processed based upon the process priority data. A product type to be manufactured is determined based upon a first factor external to a manufacturing environment. A value is assigned to at least one workpiece based upon the first factor. A process priority to process the workpiece is determined based upon the value and a second factor internal to the manufacturing environment. The workpiece is routed within the manufacturing environment based upon the process priority.

In another aspect of the present invention, a system is provided for prioritizing processing of a workpiece. The system of the present invention includes at least one workpiece and a first controller. The first controller is adapted to assign a value to the workpiece based upon first factor external to a manufacturing fab. The first controller also adapted to generate a tag indicative of a process priority for processing the at least one workpiece, the tag being associated with the workpiece. The system of the present invention also includes a second controller adapted to assign a priority to process the workpiece based upon the tag. The system of the present invention also includes a processing tool operatively coupled with the second controller, the processing tool to process the workpiece based upon the priority assigned by the second controller.

In another aspect of the present invention, an apparatus is provided for prioritizing processing of a workpiece. The apparatus of the present invention includes at least one workpiece and a controller. The controller to assign a value to at least one workpiece based upon a first factor external to a manufacturing environment. The controller being adapted to generate a tag indicative of a process priority for processing the workpiece, the tag being associated with the workpiece.

In another aspect of the present invention, an apparatus is provided for prioritizing processing of a workpiece. The apparatus of the present invention includes a semiconductor wafer comprising a tag indicative of a process priority for processing the workpiece. The process priority is based upon first factor external to a manufacturing environment.

In yet another aspect of the present invention, a computer readable program storage device encoded with instructions is provided for prioritizing processing of a workpiece. The computer readable program storage device encoded with instructions that, when executed by a computer, performs a method, comprising: providing at least one workpiece; and providing a tag associated with the workpiece. The tag includes process priority data for determining an order relating to processing the workpiece.

BRIEF DESCRIPTION OF THE DRAWINGS

The invention may be understood by reference to the following description taken in conjunction with the accompanying drawings, in which like reference numerals identify like elements, and in which:

FIG. 8 illustrates a table that lists a plurality of internal and/or external factors associated with processing a plurality of products, in accordance with one illustrative embodiment of the present invention.

Figure 1:
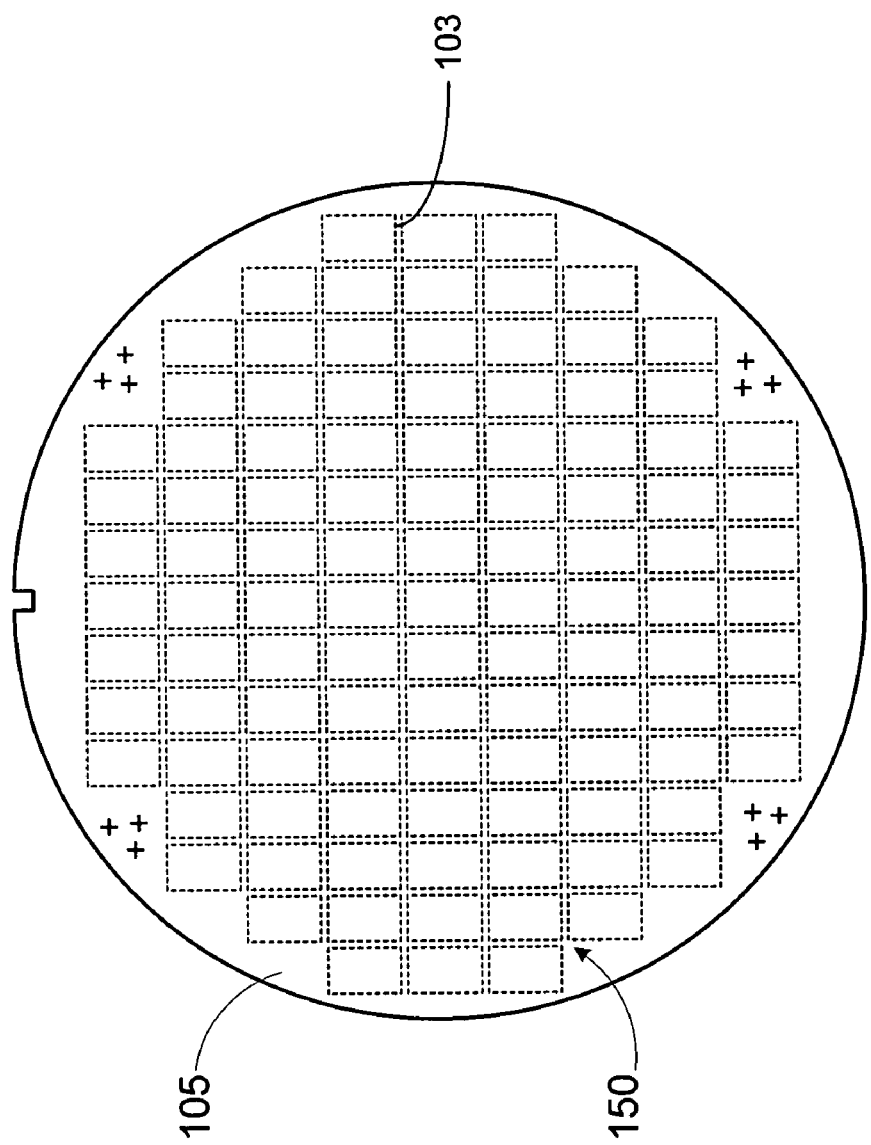
FIG. 1 illustrates a stylized depiction of a semiconductor wafer that may be processed by a semiconductor manufacturing system.
Figure 2:
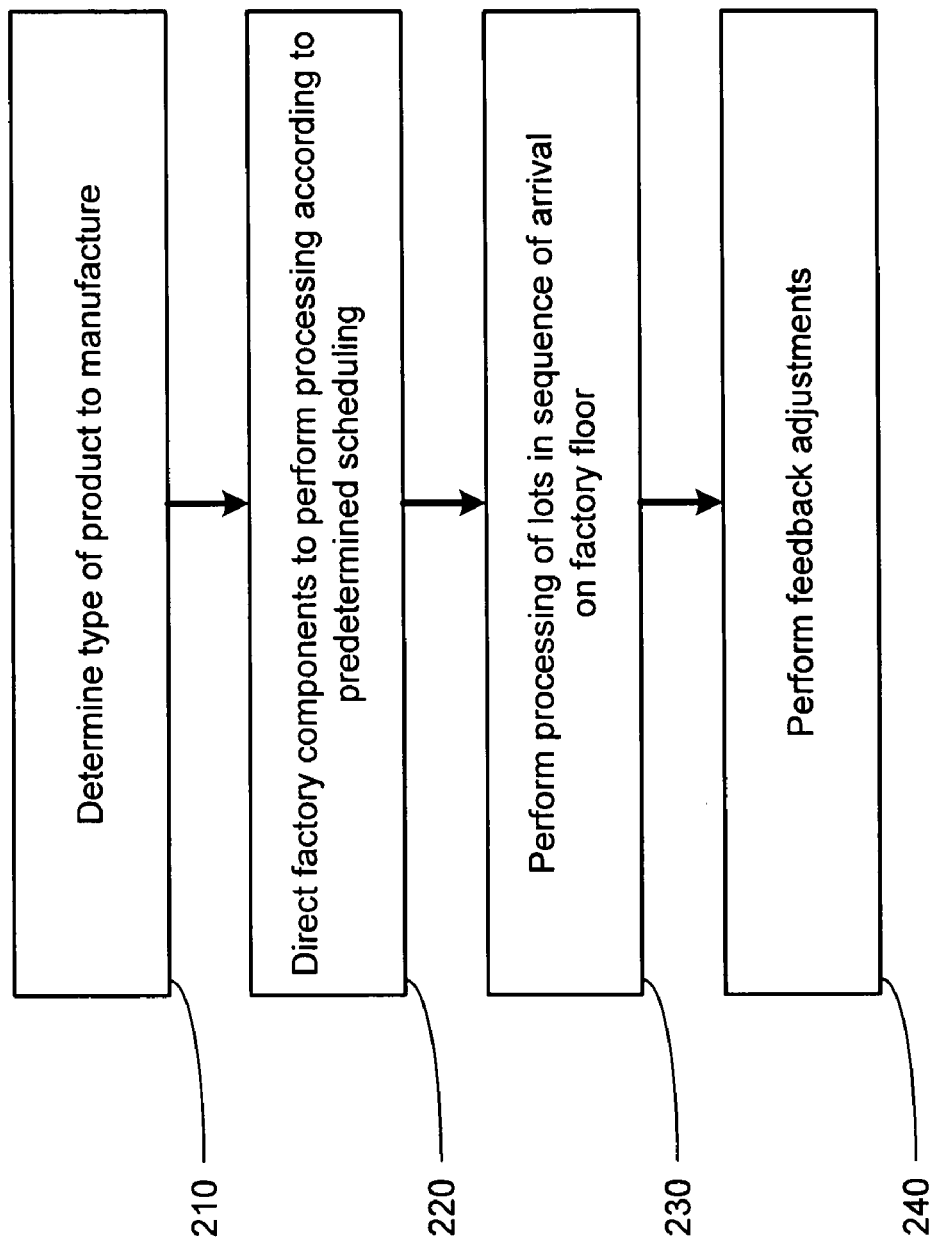
FIG. 2 illustrates a flowchart depiction of a prior art method for processing semiconductor wafers.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

There are many discrete processes that are involved in semiconductor manufacturing. Many times, workpieces (e.g., semiconductor wafers 105, semiconductor devices, etc.) are stepped through multiple manufacturing process tools. Embodiments of the present invention provide for an analysis of various factors that are external and/or internal to a manufacturing environment in order to perform a prioritization of processing particular semiconductor wafers 105. External factors may include external demand for a particular semiconductor product that is to be sold. Other external factors may include a price potential of a workpiece, a marketing basis for entering a new market, and/or considerations relating to expanding an existing market, among others.

Internal factors may include parameters relating to an availability of particular processing tools, a tool condition parameter, a potential yield parameter, a cycle time parameter, a process risk parameter, and/or a process volume parameter. Based upon the correlation of the internal and external factors, a negotiation or interaction may occur between a factory entity that provides a processing service, and an entity demanding the processing service. Based upon this interaction, a central controller may control the operation of various components associated with a fab. Based upon the negotiation/interaction described above, a process priority may be determined. The process priority may relate to a process order and/or a processing route that is to be followed by a group of workpieces.

Figure 3:
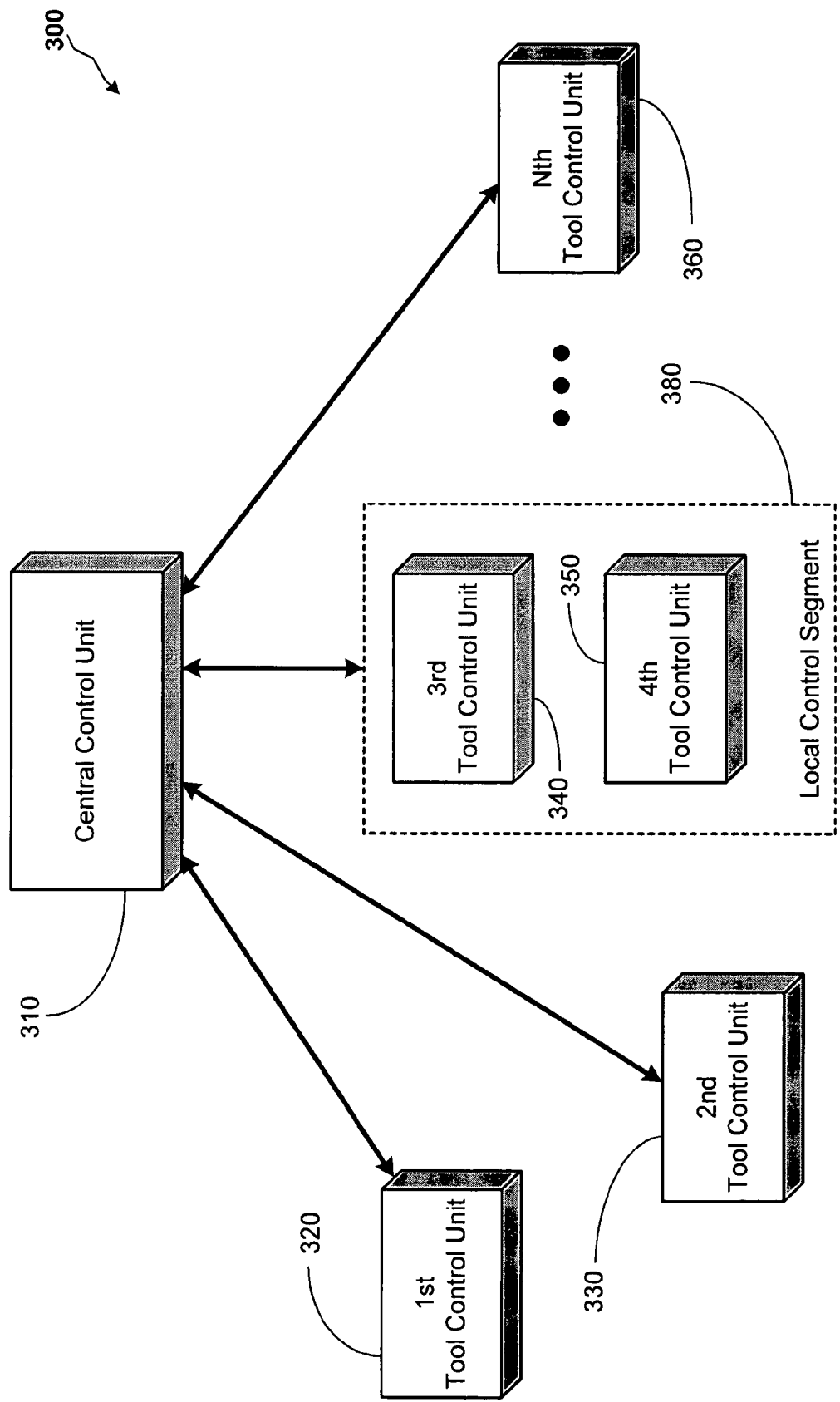
FIG. 3 illustrates a block diagram of a system depicting a central control unit for controlling a plurality of factory components, in accordance with one illustrative embodiment of the present invention.

Turning now to FIG. 3, a system 300 in accordance with one illustrative embodiment of the present invention is illustrated. The system 300 comprises a central control unit 310 that is capable of overseeing and affecting the respective operations of a plurality of process control systems associated with various components of a factory/fab. For example, a factory may comprise various processing tools that are controlled by one or more process control systems. The central control unit 310 is capable of receiving data and/or instructions from external sources (i.e., sources external to a factory) as well as internal sources (i.e., sources internal to a factory) to affect the operation of various components of a factory. External sources may include various departments of a business entity that is substantially outside of the manufacturing or processing area, e.g., the marketing department. Internal sources may include various components substantially within a manufacturing or processing environment, e.g., a local process controller, a processing tool, etc.

In one embodiment, various components of a factory/fab are represented by the blocks in FIG. 3 (a $1^{st}$ tool control unit 320, a $2^{nd}$ tool control unit 330, a $3^{rd}$ tool control unit 340, a $4^{th}$ tool control unit 350, through an $N^{th}$ tool control unit 360). The $1^{st}$ through $N^{th}$ tool control (TC) units 320-360 may each comprise one or more processing tools, a local processing controller, and/or other elements for performing semiconductor wafer processing. A more detailed illustration of the $1^{st}$ through $N^{th}$ tool control units 320-360 is provided in FIG. 4 and accompanying description below.

Continuing referring to FIG. 3, in one embodiment, the $3^{rd}$ tool control unit 340 and the $4^{th}$ tool control unit 350 may be grouped into a local control segment 380. Therefore, a single process controller may control the operation of both the $3^{rd}$ and $4^{th}$ tool control units 340, 350. Therefore, using a single communications protocol, the central control unit 310 may direct the operation of the elements within the local control segment 380. The local control segment 380 may be considered a sort of an "island of control" among the vastness of a factory/fab manufacturing area.

The central control unit 310 is capable of receiving external factors, such as information relating to a demand for a particular integrated circuit chip formed from a processed semiconductor wafer 105, business factors such as price and yield factors, new-market factors, cost of operation factors, etc. These external factors may be considered in the context of internal factors, i.e., availability of particular tools, a tool condition parameter, a potential yield parameter, a cycle time parameter, a process risk parameter, a process volume parameter, etc. The consideration of internal and external factors facilitate a sort of "negotiation" or interaction between a set of semiconductor wafers 105 that are to be processed, and particular elements of the factory/fab floor such as the $N^{th}$ tool control unit 360. The central control unit 310 may comprise hardware, software, and/or firmware components that are capable of facilitating negotiations between a factory component (i.e., a service provider), and an entity demanding the service, (e.g., a control system forwarding the workpiece(s) to be processed). These negotiations or interactions may be used to determine an appropriate course of action for providing priority for, and processing of a batch/lot of semiconductor wafers 105. Additional details relating to the operation of the central control unit 310 is provided below.

Figure 4:
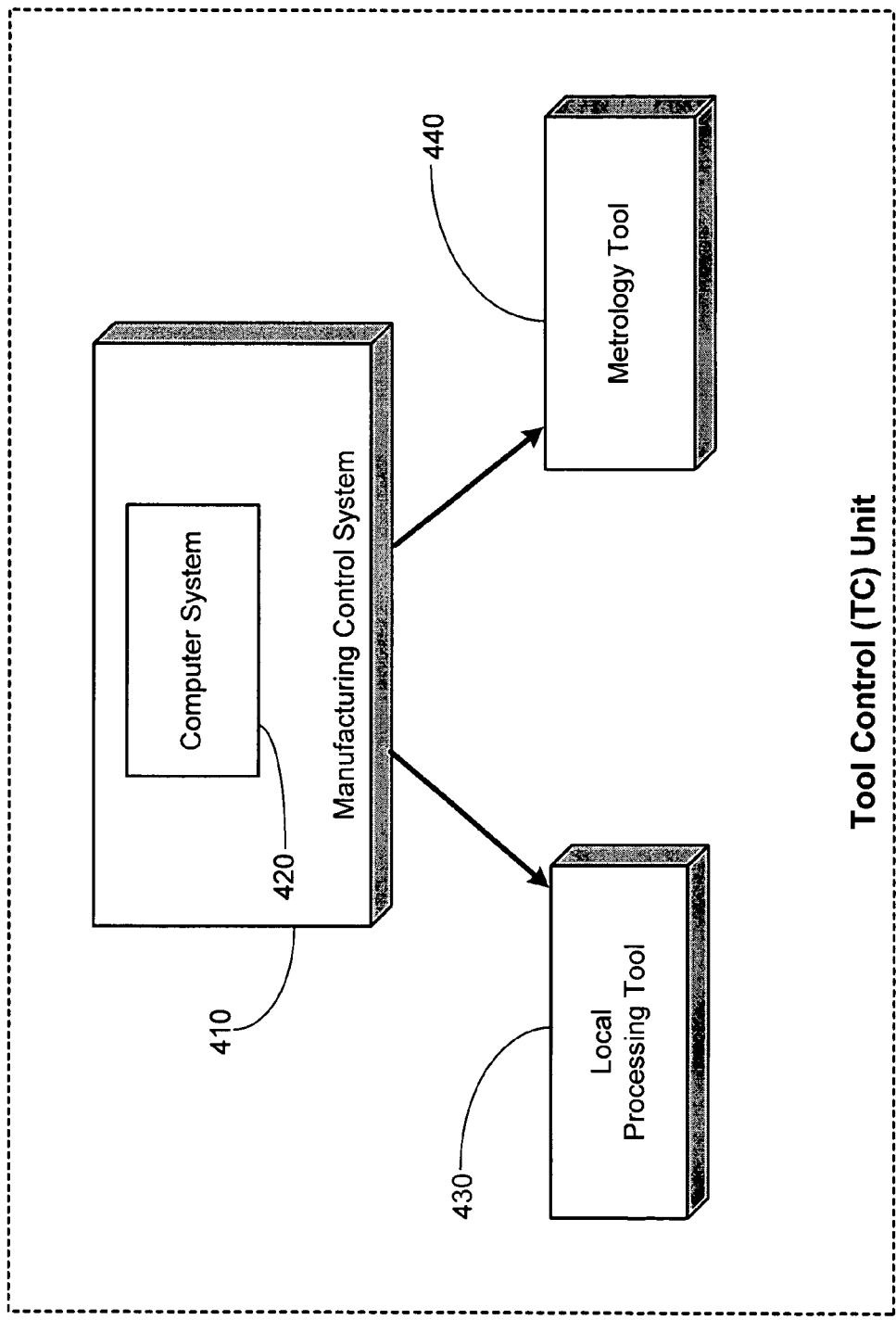
FIG. 4 illustrates a more detailed block diagram depiction of a tool control unit of FIG. 3, in accordance with one illustrative embodiment of the present invention.

Turning now to FIG. 4, a block diagram depiction of the tool control units 320-360, in accordance with one embodiment of the present invention, is illustrated. Each of the tool control units 320-360 may comprise a manufacturing control system 410 that is capable of controlling the operation of a local processing tool 430 and a metrology tool 440. The local processing tool 430 may be an etch tool, a deposition tool, a chemical-mechanical polishing (CMP) tool, a photolithography tool, or any other tool used to process semiconductor wafers 105. The metrology tool 440 is capable of acquiring metrology data from a processed semiconductor wafer 105 that is processed by the local processing tool 430. A computer system 420 associated with the manufacturing control system 410 is capable of performing various tasks, such as calculating recipe parameters and generating control parameters to direct the operation of the local processing tool 430.

The manufacturing control system 410 may receive data from the central control unit 310, which may provide control and priority information relating to a particular lot or group of semiconductor wafers 105 that are to be processed. The information may include a "currency" or value associated with a particular semiconductor wafer 105 or a batch of semiconductor wafers 105. The currency/value may relate to a value that is associated with a semiconductor wafer 105 based upon a plurality of internal and/or external factors. Various portions of a factory/fab may react to particular values or the currency associated with a semiconductor wafer 105, or to a batch of semiconductor wafers 100.

Based upon the currency/value associated with a particular batch or semiconductor wafers 105 that is sent to the tool control units 320-360, the manufacturing control system 410 may perform an assessment of the availability of the local processing tool 430 and/or the metrology tool 440. In one embodiment, the manufacturing control system 410 may communicate and/or negotiate with another corresponding manufacturing control system 410 in another tool control unit. Hence, the central control unit 310 facilitates negotiations, between the various tool control units 320-360 in order to direct the processing of semiconductor wafers 105 through the factory/fab. In an alternative embodiment, the manufacturing control system 410 may reside outside the tool control units 320-360. In this embodiment, the manufacturing control system 410 may direct the operation of various tool control units 320-360. Additional discussion relating to the manufacturing control system 410 is provided in FIG. 5 and accompanying description below.

Figure 5:
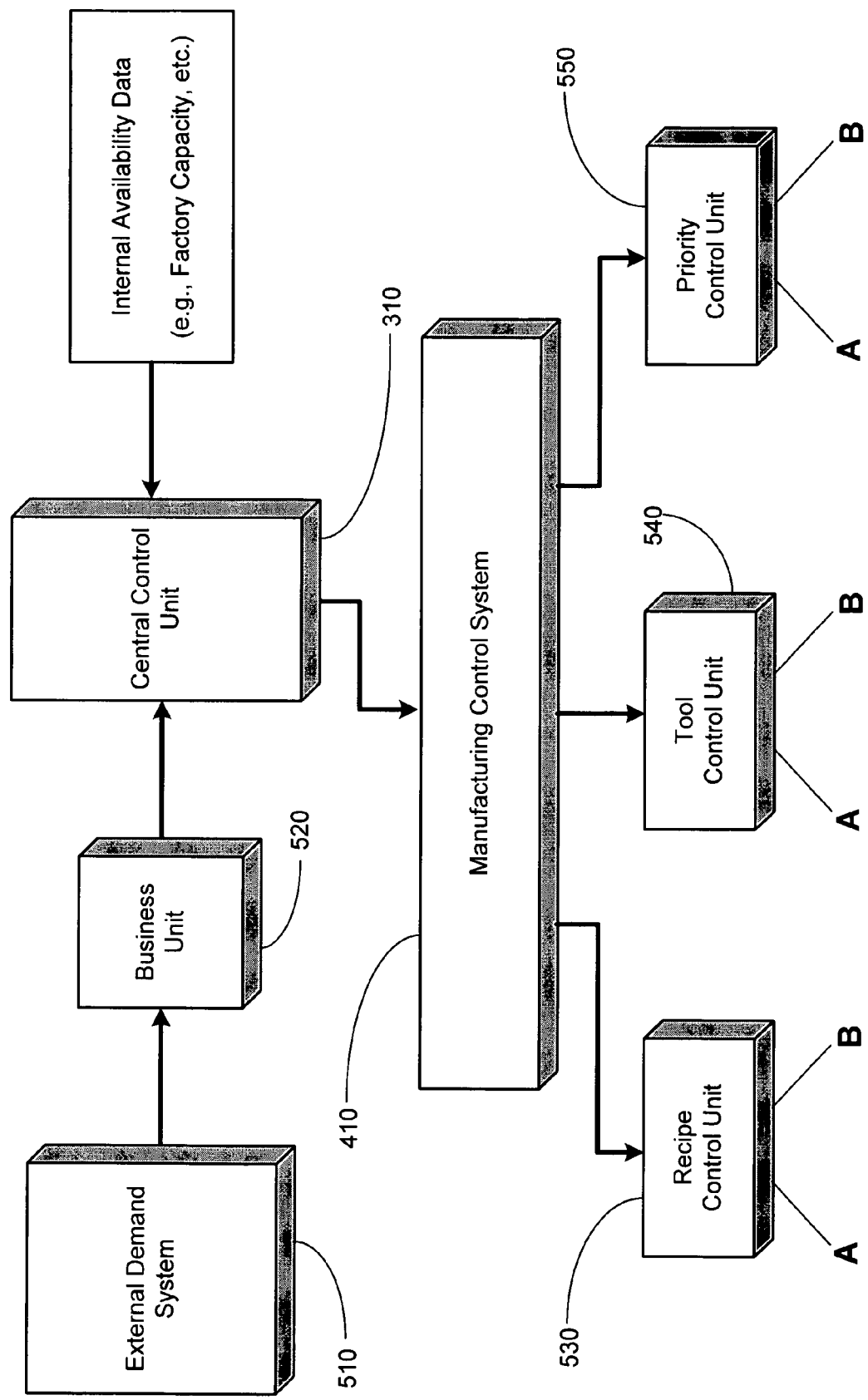
FIG. 5 illustrates a block diagram depiction of an interaction between internal factors, external factors, and the central control unit, for controlling a manufacturing control system, in accordance with one illustrative embodiment of the present invention.

Turning now to FIG. 5, a block diagram depiction of the interaction between the central control unit 310 and a manufacturing control system 410, in accordance with an illustrative embodiment of the present invention is illustrated. A system for manufacturing semiconductor wafers 105 may comprise an external demand system 510 that may provide various decision-making instructions and/or data relating to various external and/or internal factors that affect the operation of a wafer fab or factory. In one embodiment, the external demand system 510 may incorporate a number of entities, such as databases, software units, business organizations, etc, that are capable of providing data relating to marketing decisions, product demand, pricing data, etc. As an example, the external demand system 510 may provide data that reveals a large emphasis upon manufacturing a particular product that may assist in expanding into a new market. For example, a new type of processor may involve lower yields, larger processing cycle times, etc., but may provide a company with an opportunity to enter a new, emerging market. This consideration may drive the operation of processing of semiconductor wafers 105 in a different direction as compared to previous, more efficient operations.

A business unit 520 illustrated in FIG. 5 may be a software unit, a computer system, etc., that is capable of receiving data from the external system 510. Based upon data from the external demand system, the business unit 520 may provide the central control unit 310 with data and instructions relating to processing semiconductor wafers 105. In one embodiment, the business unit 520 is capable of processing data from the external demand system 510 to provide a value indication or a value tag associated with a particular lot of wafers, batch of wafers, a group of wafers, and/or with a particular semiconductor wafer 105. The business unit 520, for example, may consider various business-related aspects such as market demand, price of completed product, yield, cycle time, risk factors in proceeding with a particular type of processing. The business unit 520 may also consider various other business-related considerations relating to processing semiconductor wafers 105 that are known to those skilled in the art having benefit of the present disclosure. Based upon these considerations, the business unit 520 may provide a "value" or a "currency" designation that is associated to a particular set of wafers 105. A more detailed table illustration of the currency/value associated with a particular batch of semiconductor wafers 105 is illustrated in FIG. 8 and accompanying description below. The currency value relating to a particular batch of semiconductor wafers 105 may be used by a manufacturing system to prioritize and/or schedule processing of the particular batch of semiconductor wafers 105.

Continuing referring to FIG. 5, the central control unit 310 may receive a value associated with a batch of wafers and/or other business-related data from the business unit 520. The central control unit 310 may also receive internal availability data from various portions of the factory floor. The internal availability data may comprise information relating to availability of certain processing tools in the factory, availability of measurement resources (e.g., metrology tools), queues in the fab, and/or various other factory-related information known to those skilled in the art having benefit of the present disclosure. Upon considering the various business-related information as well as the other internal data, the central control unit 310 may determine a potential route and processing strategy to be undertaken by various processing tools, such as the tool in the $1^{st}$ through $N^{th}$ tool control units 320-350. In other words, a sort of negotiations or interaction may take place between various components in the factory and an entity demanding resources for processing a particular set of semiconductor wafers 105. This interaction may result in prioritizing and scheduling of processing of the semiconductor wafers 105.

Data relating to the negotiations/interaction is sent to the manufacturing control system 410. Utilizing the external and/or internal considerations, the manufacturing control system 410 is capable of providing control parameter data to various components (e.g., processing tools) within the system 300. The manufacturing control system 410 may supply various process control parameters (e.g., data for a recipe control unit 530, data for a tool control unit 540, and/or priority data for a priority control unit 550) for processing semiconductor wafers 105. The recipe control unit 530, tool control unit 540, and/or the priority control unit 550 may be software, hardware and/or a firmware unit that may be positioned in one or more of a variety of locations in the system 300.

The data sent to the priority control unit 550 may contain data relating to selecting particular tools or routes for processing particular lots of semiconductor wafers 105. Based upon the data from the manufacturing control system 410, the recipe control unit 530 is capable of delivering one or more recipe parameters for process operations by various tools in the system 300. In the illustrative example in FIG. 5, the recipe control unit 530 may provide a recipe A and a recipe B, corresponding respectively to a product A and a product B, which are to designated to be manufactured by processing semiconductor wafers 105. Further, the tool control unit 540 is capable of affecting the operations of one or more tools within the system, e.g., controlling a photolithography tool, an etch tool, a CMP tool, a deposition tool, etc. The tool control unit 540 may provide control parameters that may be directed to a processing tool A and/or a processing tool B.

The manufacturing control system 410 may also provide priority data that may provide a hierarchy control for determining a priority of operations relating to various tools within the system 300. The priority data may provide a priority indication to the processing tool A, which may be assigned to a first priority, and to the processing tool B, which may be assigned to a second priority in processing. Therefore, utilizing the priority data, one of the tools within the $1^{st}$ through $N^{th}$ tool control units 320-350 may be selected for operation. Therefore, if the first priority is associated with processing tool A, the recipe control unit 530 provides recipe parameters to tool A. The processing tool A may be controlled by the tool control unit 540, which provides control parameter data to tool A. In an exemplary implementation of an embodiment of the present invention, processing tool A may be a photolithography tool and processing tool B may be an etch tool. Similar priority may also be assigned to various lots/batches of semiconductor wafers 105.

Figure 6:
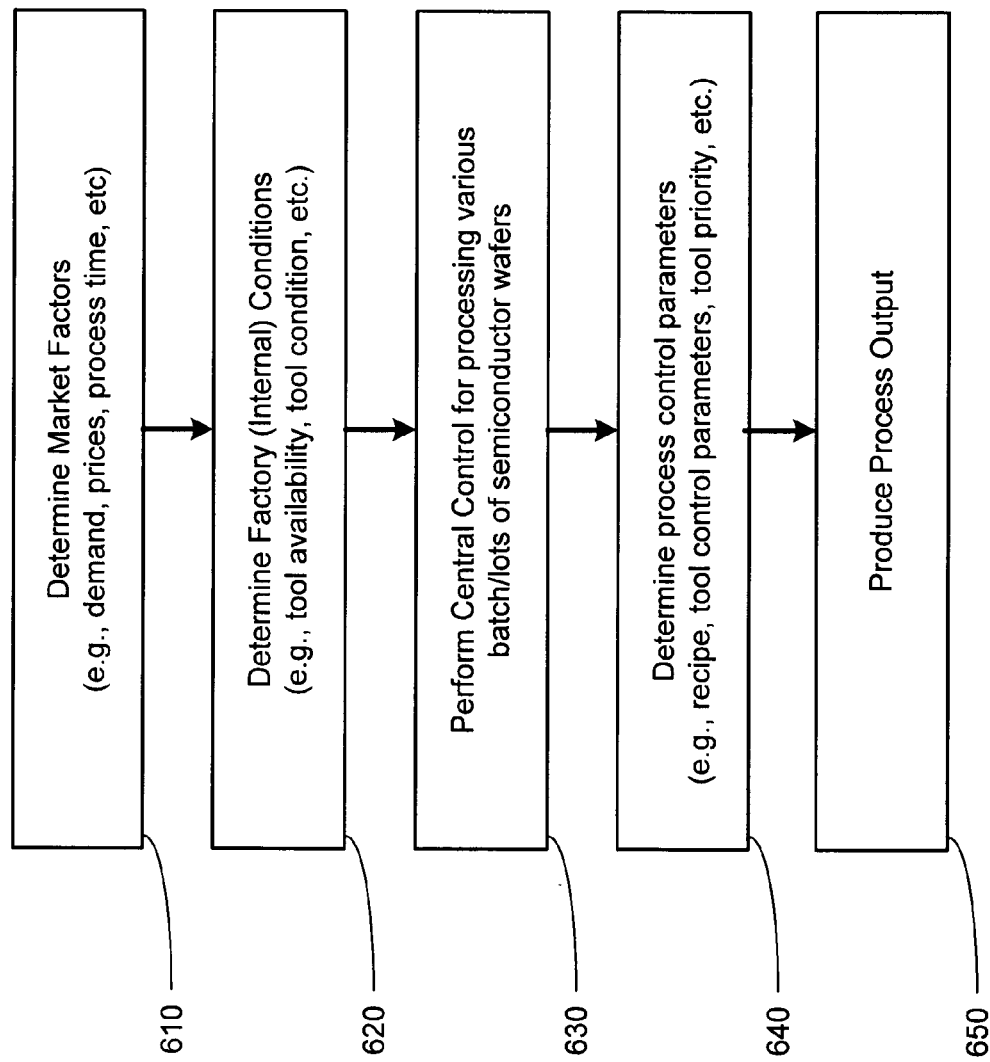
FIG. 6 illustrates a flowchart depiction of steps associated with a method in accordance with one illustrative embodiment of the present invention.

Turning now to FIG. 6, a flowchart depiction of a method in accordance with an illustrative embodiment of the present invention is provided. The system 300 may determine particular market factor(s) that may affect process operations of semiconductor wafers (block 610). The market factors may comprise various external factors, such as demands, prices, time of processing, etc. The system 300 may also determine various factory conditions or internal factors, such as availability of particular tools within the factory/fab, conditions of the processing tools, accuracy of the tools, and/or various other internal parameters (block 620). Based upon the external market forces and/or the internal factors, the central control unit 310 may coordinate and control the operations of various components (e.g., such as the various tool control units 320-360) for processing various wafer batches presented to the factory for processing (block 630). A more detailed flowchart depiction of the step described in block 630 is provided in FIG. 7 and accompanying description below.

Continuing referring to FIG. 6, performing the central control, which includes overseeing the coordination of various components of the factory, may lead to the determination of various process control parameters (block 640). These parameters may include recipe parameters for selecting a particular recipe for processing wafers 105. The parameters may also include a designation relating to the selection of a particular processing tool to be employed (e.g., selecting a particular photolithography and/or etch tool). The parameter may also include data relating to the priority relating selecting a particular batch of wafers that are to be processed by a particular tool. Based upon the process control parameters, the system 300 produces an output (i.e., a processed workpiece) by processing one or more semiconductor wafers 105 (Block 650).

Figure 7:
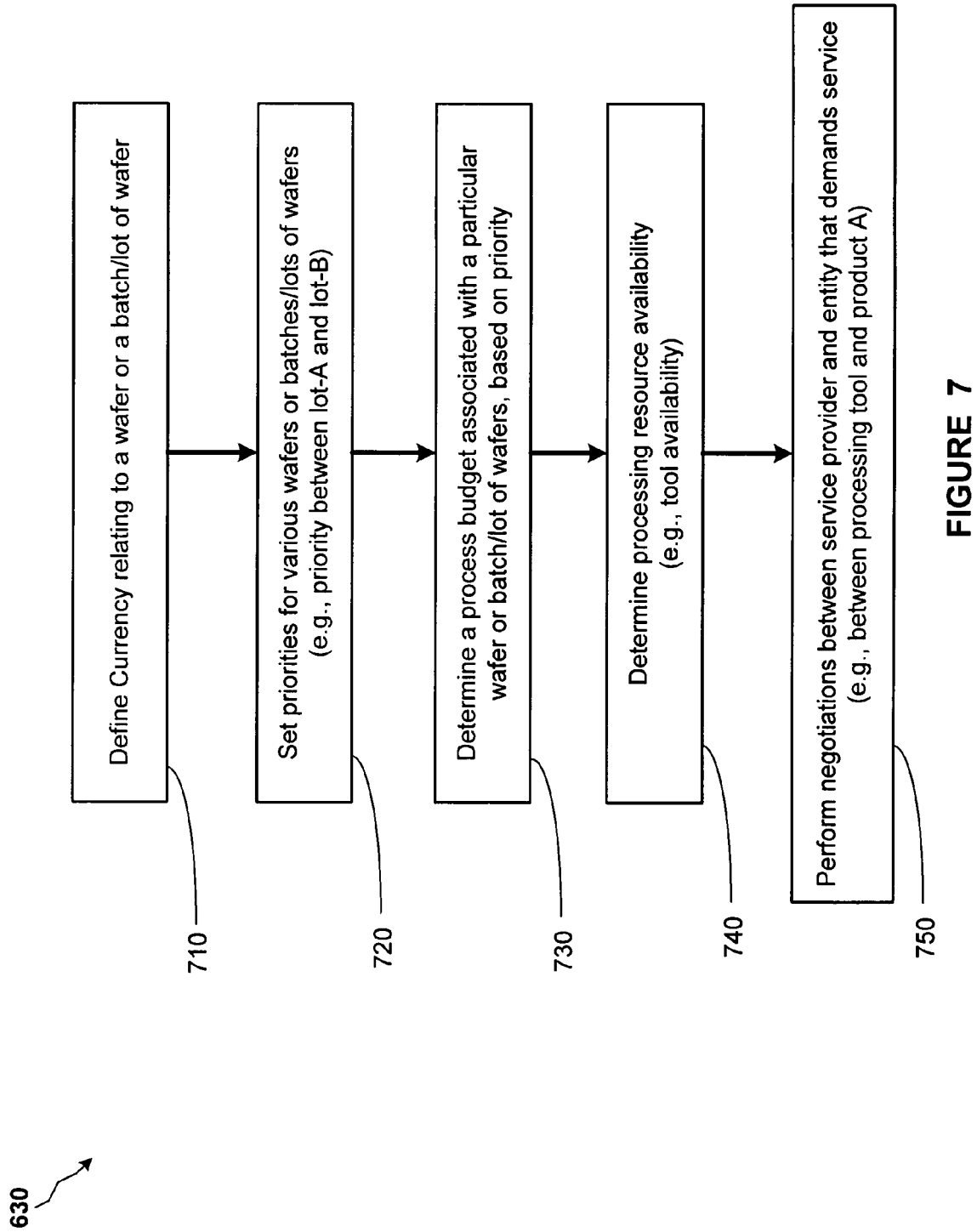
FIG. 7 illustrates a more detailed flowchart depiction of the step of performing a central control processing (of FIG. 6), in accordance with one illustrative embodiment of the present invention.

Turning now to FIG. 7, a more detailed flowchart depiction of the step described in block 630 of FIG. 6, in accordance with one illustrative embodiment of the present invention, is provided. Based upon the external market factors, which may be provided by the external demand system 510, and/or the internal factory conditions, a value is assigned to a single wafer or to a batch of wafers (block 710). In one embodiment, a tag indicative of the currency/value may be associated with the wafer (or with the batch of wafers). In other embodiments, a value relating to a batch of wafers may be stored in memory (e.g., memory associated with computer system 420) for retrieval and prioritizing processing of the wafers. In some embodiments, a physical tag or label may be affixed to the wafer(s), wherein the tag or label may be a passive object (e.g., a coded object) or an electronically active object (e.g., a wireless device). In another embodiment, a software tag may be associated with the wafer(s), indicating their value. In yet another embodiment, a tag or label may be affixed to a carrier (e.g., a cartridge) that is capable of transporting one or more wafers.

A tabularized illustration of the currency/value of two exemplary sets of wafers associated with two products (product A and product B), and their respective factors are depicted in FIG. 8. The Table in FIG. 8 illustrates a column for product A, which may be a new type of processor for example, as well as a column for product B, which may be a memory device. The currency/value of product A may be determined by analyzing various internal and/or external factors. As illustrated in the exemplary comparison in FIG. 8, manufacturing of product A may be associated with low yield, wherein the manufacturing of product B may result in a higher yield for product B. However, product A, which may be a novel processor that may have a high selling price, may be more valuable than product B, which may be associated with a low selling price (e.g., a low-density flash memory chip). Upon analysis of the cycle time, the process used to produce product A may be associated with low cycle time, in contrast with the processing associated with product B, which may be associated with a higher cycle time. Manufacturing and processing a complex product, such as product A, may result in the volume of the processed wafers to be low in contrast with the volume of processed wafers associated with product B.

Additionally, risk factors may be associated with processing wafers. For example, as illustrated in FIG. 8, processing wafers that are directed to ultimately becoming product A may be associated with a high risk factor, in contrast to the relatively low risk associated with processing of wafers associated with product B. Another consideration illustrated in the table of FIG. 8 includes the benefit of capturing new markets by expanding the demand for a new type of processor, as a result of assigning priority to product A. In contrast, the business factor that is beneficial to producing product B may include expanding existing markets, which may result from the additional sales provided by the expanded market. Based upon these and/or other factors, a currency or value of "X" may be assigned to wafers slated to become product A, which may be a larger value as compared to a value of "Y" associated with wafers that are slated to ultimately become product B.

Referring back to FIG. 7, based upon the definition of a currency for a particular wafer or a batch of wafers, the system 300 may set priorities for assigning which product (i.e., product A or product B) is to be given more weight or priority (block 720). Therefore, the currencies or values (i.e., value of X and value of Y) may be used to determine the prioritizing of processing particular wafer(s). Hence, different products may have their own respective currencies/values associated with different batch of corresponding wafers. Upon setting the priorities of wafers slated to becoming either product A or product B for example, the system 300 determines a "process budget" fixed by the priority (Block 730). These budgets may refer to a valuation system that provides for assigning a particular value a set of wafers to be utilized in negotiations or interactions between a service provider (e.g., a processing tool) and a service demand entity (e.g., external input, process controller, etc.). This interaction provides for determining which batch of wafers are given priority in a fab. For example, if a value equaling X is higher a wafer value of Y, then the budget for utilizing processing resources for processing wafer associated with value X, which may be associated with product A, may be given priority. The budget may be determined by one or more of the set of priorities exemplified in block 720.

Upon determining the budget, the system 300 may also determine processing resource availability, such as the availability of any particular processing tool (block 740). Based upon this availability and the processing budget, process operation priority may be negotiated between the service demand entity (i.e., entity representing product A, process controller, etc.) and the service provider (i.e., various processing tools) (block 750). Based on these negotiations, process control parameters may be determined by the central control unit 310.

The process priority and the process control parameters are then used to process the semiconductor wafer 105 to produce the process output (as indicated in block 650 of FIG. 6).

Utilizing embodiments of the present invention, consideration of external factors and/or internal factors may be provided to determine the prioritization relating to the processing of a wafer or a batches of wafers. A negotiation or interaction between the entities that provide processing services and the entities that represent the wafers to be processed, may take place to prioritize processing tasks, such that optimum product output characteristics may be provided.

The principles taught by the present invention can be implemented in an Advanced Process Control (APC) Framework, such as a Catalyst system offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699-Provisional Specification for CIM Framework Domain Architecture) and APC (SEMI E93-0999—Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   receiving at least one workpiece, said at least one workpiece comprising an associated value, said value being assigned using a first controller, said value comprising process priority data for determining an order relating to processing said at least one workpiece;
   providing a physical tag associated with said at least one workpiece based upon said process priority data;
   assigning, using a second controller, a priority to process said at least one workpiece based upon at an indication on said physical tag, said second controller is a central control unit controlling a plurality of tool control units, said plurality of tool control units each comprise at least one processing tool, a metrology tool, and a local controller controlling said at least one processing tool and said metrology tool; and
   processing said at least one workpiece based upon said tag.

2. The method of claim 1, wherein receiving said at least one workpiece further comprises receiving a semiconductor wafer.

3. The method of claim 1, further comprising using said process priority data with at least one internal factor to determine said process priority, said internal factor relating to a parameter relating to a fab.

4. The method of claim 3, wherein using said process priority data with said internal factor further comprises using a business factor with at least one of a tool availability parameter, a tool condition parameter, a potential yield parameter, a cycle time parameter, a process risk parameter, and a process volume parameter.

5. The method of claim 1, further comprising processing said workpiece based upon said order relating to processing said workpiece.

6. The method of claim 4, wherein further comprising processing a subsequent workpiece.

7. A method, comprising:
   determining a product type to be manufactured based upon a first factor external to a manufacturing environment;
   assigning, using a first controller, a value to at least one workpiece based upon said first factor, wherein said value is associated with a physical tag associated with said at least one workpiece;
   determining a process priority to process said at least one workpiece based upon said value and a second factor internal to said manufacturing environment;
   assigning, using a second controller, a priority to process said at least one workpiece, said second controller is a central control unit controlling a plurality of tool control units, said plurality of tool control units each comprise at least one processing tool, a metrology tool, and a local controller controlling said at least one processing tool and said metrology tool; and
   routing said at least one workpiece within said manufacturing environment based upon said process priority.

8. The method of claim 7, further comprising processing said at least one workpiece based upon said routing.

9. The method of claim 7, further comprising processing an additional workpiece.

10. The method of claim 7, wherein determining a product type to be manufactured based upon a first factor external to said manufacturing environment further comprises determining said product type based upon a marketing basis for entering a new market.

11. The method of claim 7, wherein determining a product type to be manufactured based upon a first factor external to said manufacturing environment further comprises determining said product type based upon a price potential of said product type.

12. The method of claim 7, wherein determining a product type to be manufactured based upon a first factor external to said manufacturing environment further comprises determining said product type based upon a expanding an existing market share.

13. The method of claim 7, wherein determining a process priority to process said workpiece based upon said value and said second factor internal to said manufacturing environment further comprises assigning priority to said workpiece based upon said value and an internal parameter from a group consisting of a potential yield, a cycle time, and a process volume potential.

14. The method of claim 7, wherein assigning a value to at least one workpiece further comprises assigning a value in response to a determination that capturing a new market is comparatively more valuable than expanding an existing market.

15. A system, comprising:
   a first controller to assign a value to at least one workpiece based upon a first factor external to a manufacturing fab, said first controller to generate an indication on a physical tag indicative of a process priority for processing said at least one workpiece, said indication on the physical tag being associated with said at least one workpiece;
   a second controller to assign a priority to process said at least one workpiece based upon said indication on the physical tag, wherein said second controller is a central control unit controlling a plurality of tool control units, said plurality of tool control units each comprise at least one processing tool, a metrology tool, and a local controller controlling said at least one processing tool and said metrology tool.
   a processing tool operatively coupled with said second controller, said processing tool to process said at least one workpiece based upon said priority assigned by said second controller.

16. The system of claim 15, wherein said processing tool is adapted to process a subsequent workpiece.

17. The system of claim 15, wherein said first factor is based upon at least one of a price potential of said workpiece, a marketing basis for entering a new market, and expanding an existing market.

18. The system of claim 15, wherein said priority assigned by said second controller is further based upon said first factor and a second factor, said second factor comprising at least one of a tool availability parameter, a tool condition parameter, a potential yield parameter, a cycle time parameter, a process risk parameter, and a process volume parameter.

19. The system of claim 15, wherein said at least one said workpiece is a batch of workpieces.

20. The system of claim 15, wherein said workpiece is a semiconductor wafer.

* * * * *